July 11, 1944.  J. D. M. GRAY  2,353,303
AIRCRAFT CONTROL
Filed Dec. 12, 1940
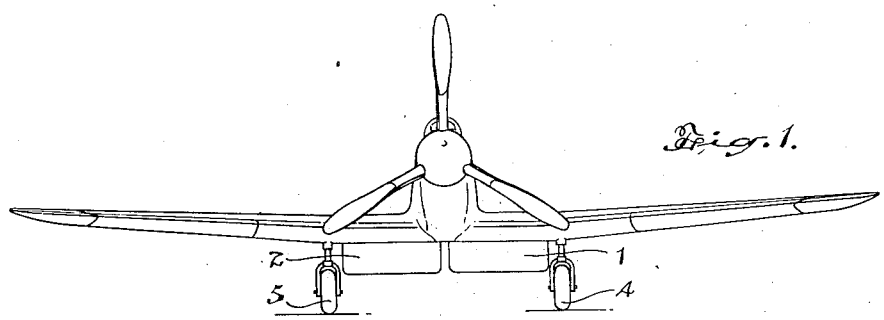
Fig. 1.
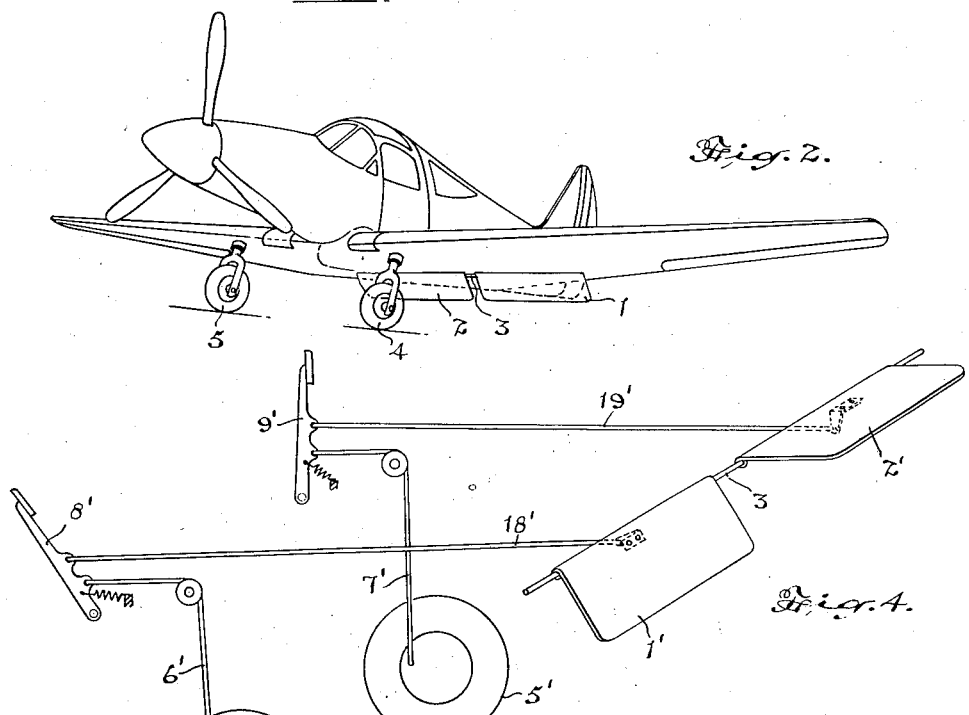
Fig. 2.
Fig. 4.
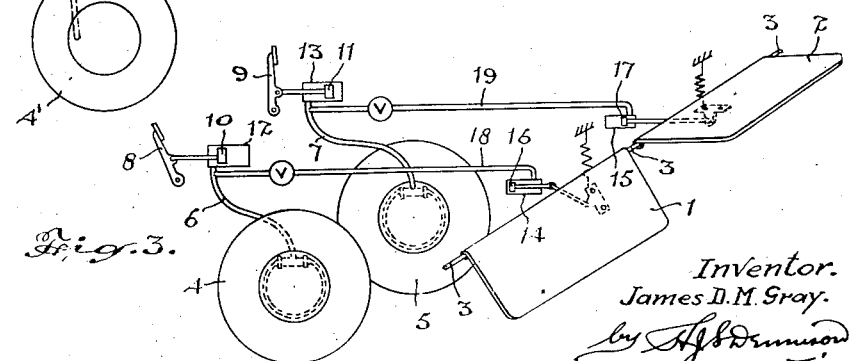
Fig. 3.
Inventor.
James D. M. Gray.

Patented July 11, 1944

2,353,303

UNITED STATES PATENT OFFICE 2,353,303

AIRCRAFT CONTROL

James D. M. Gray, Toronto, Ontario, Canada, assignor of twenty per cent to Thomas J. Agar, and twenty-five per cent to Harry W. Terry and Herbert W. McIntosh, all of Toronto, Ontario, Canada Application December 12, 1940, Serial No. 369,707

3 Claims. (Cl. 244—110)

The principal objects of this invention are to enhance the maneuverability of aircraft and to provide an improved braking system which will operate efficiently in conjunction with the landing wheel brakes and the conventional control means therefor in order to supplement their braking effort selectively or collectively.

The principal feature of the invention resides in the novel combination with the selective braking means of the port and starboard wheels, of air-brake flaps or the like which are so co-related to the respective wheel brakes and control mechanism thereof that application of both brakes simultaneously will bring the respective flaps into air-braking position while application of either the port or starboard wheel-brake will bring into play only the port or starboard air flap.

In the drawing,

Figure 1 is a front elevational view of an aircraft equipped with the present invention.

Figure 2 is a perspective view of the craft shown in Figure 1.

Figure 3 is a diagrammatic view representative of a hydraulic control system.

Figure 4 is a diagrammatic representation of a mechanical control system.

It is common practice in the construction of aircraft having landing wheels, to provide such wheels with brakes which are adapted to be selectively or collectively operated by pressing down on separate brake pedals or the like which are respectively connected to the port and starboard wheel brakes, either by mechanical connections or hydraulically, or otherwise.

It is the primary purpose of the present invention to co-relate this selective type of braking system on aircraft with air flaps or other equivalent air braking means so that the braking effort of either wheel will be automatically supplemented by the air-braking means located on the respective side of the aircraft, and by means of which simultaneous application of both wheel brakes will concurrently render both port and starboard air brakes effective irrespective of whether the landing wheels have contacted the ground.

The present invention further contemplates improved maneuverability of the plane, not only in turning on the ground but also during flight, wherein the wheel-brake control mechanism becomes a control factor in the operation of the aircraft in flight.

In carrying the present invention into effect according to the preferred form, a pair of air flaps 1 and 2 are pivotally mounted at their forward edge on the main wing structure or fuselage to pivot about a substantially common transverse axis indicated at 3, which axis is preferably arranged forwardly of the rearward or trailing edge of the wing structure, so that when the flaps are inactive they will be accommodated closely adjacent to the undersurface of the wings to minimize air resistance.

In aircraft construction of the low or underslung wing type the air flaps 1 and 2 may extend well in under the fuselage so that their inner edges substantially meet adjacent the vertical central plane of the latter, particularly in single-engined craft, but in multi-engined craft they may be spaced apart a greater distance or may, in the higher wing type of craft, be located entirely at the outward side of the fuselage.

The landing wheels 4 and 5 are provided with any suitable conventional form of braking equipment (not shown) from which, in the present instance, hydraulic actuating cables or conduits 6 and 7 are shown extending.

Brake control pedals 8 and 9 of any conventional form are represented in the present instance as connected respectively with hydraulic displacement pistons 10 and 11 arranged in fluid-displacement cylinders 12 and 13.

A pair of hydraulic cylinders 14 and 15 are associated respectively with the flaps 1 and 2 and are provided with pistons 16 and 17 operatively connected with the respective flaps.

The hydraulic conduits 6 and 7, which are preferably of the flexible form, are connected with the displacement cylinders 12 and 13 respectively, and branch tubular connections 18 and 19 lead from the conduits 6 and 7 and are connected respectively with the flap control cylinders 14 and 15.

It will thus be seen that when the port brake pedal 8 is depressed to brake the port wheel the respective port flap 1 will be simultaneously operated so that it will assume its braking position and thereby supplement the braking action of the port wheel. Similarly when the starboard brake pedal 9 is depressed the starboard flap 2 will be automatically swung downwardly into braking position, thereby supplementing the braking action of the starboard wheel.

When both brake pedals 8 and 9 are depressed to brake both port and starboard wheels both of the air flaps will be brought downwardly into braking position.

While for purposes of illustration I have shown a simplified more or less diagrammatic arrangement of a hydraulic control system, it will be readily appreciated that other forms of controls may be resorted to including servo mechanisms which may be hydraulic, electric, vacuumatic or mechanical or any suitable combination of these.

In the modification shown in Figure 4 the wheels 4' and 5' are provided with mechanical brakes (not shown) having operating cables 6' and 7' leading therefrom and connected with the brake levers or pedals 8' and 9' respectively. The air flaps 1' and 2' have connected therewith operating cables 18' and 19' which are also respectively connected with the brake levers or pedals 8' and 9' so that on operation of either of the mechanical brakes the respective air flaps will be moved into effective braking position.

It will be readily appreciated that a particularly efficient combination is provided for in the invention herein defined involving many advantages over the conventional independently controlled one-piece air flap.

When a pilot is about to land the aircraft and it is desired to decelerate the air speed as much as possible before making contact with the ground or runway, both brake pedals will be simultaneously depressed so that both flaps will be brought down into effective braking position so that when the wheels finally contact the runway the combined braking action of the air flaps and wheels will become effective to quickly check the speed of the craft.

When the aircraft is about to take off and immediately after the wheels have left the ground the pilot, by pressing down both brake pedals, may bring the port and starboard flaps down in angular relation to the line of flight, thereby giving greater "lift" to the craft.

The selectively controllable flaps provide for better maneuverability either on the ground or in the air and enable better cross-wind landings and take-offs. Further, more effective control of the craft is provided for particularly near the stalling speed, since increased lift can be quickly thrown to either the port or starboard wing, and the relative control of the flaps will be an important factor in turning at slow speed and with the minimum banking.

The selectively operable air flaps will also serve an important function in co-operation with the wheel brakes during turning operations on the ground, since, when the port or starboard brake is applied, the respective flap only will be lowered and will receive the thrust of the slip stream, thus greatly assisting retarding action on the braked side of the craft.

It will be further appreciated that by enabling one flap to be lowered independently of the other the effective control surface of the tail wing or rudder will not be blanketed which is an objection to the present one-piece type of flap, and when applied to dive-bombing craft improved control in the yawing plane will be provided for.

The improved control herein defined when applied to multi-motored aircraft provides an improved controlling factor on the failure of one or more wing engines, thereby relieving the strain on the rudder and controls and reducing pilot fatigue.

While for purposes of illustration I have shown simple exemplary forms of the present invention and control means therefor, I may resort to various modifications or structural interpretations within the essential spirit of the invention.

What I claim as my invention is:

1. In an aircraft having landing wheels at the port and starboard sides, individually manually actuated brake-control means for said port wheel and individually manually operable brake control means for said starboard wheel, a pair of air-brake flaps transversely pivoted on the aircraft substantially parallel with the wing structure one at each side of the vertical centre plane, and operable to swing downwardly in an angular relation to the wings, an operating connection between the port flap and the first-mentioned wheel brake-control means to swing the port flap downwardly into air-braking position on the actuation of said port wheel braking means, and an operative connection between the starboard flap and the second-mentioned brake-control means to swing said starboard flap downwardly into air-braking position on the actuation of said starboard wheel braking means.

2. In an aircraft having landing wheels each provided with separately and selectively operable braking means, a pair of air flaps pivotally mounted transversely of and below the wings of said aircraft, foot control means for individually swinging said air flaps, and means connecting said foot control means individually with said individual braking means.

3. In an aircraft having landing wheels disposed at the port and starboard sides of the craft and separate brake control means for selectively braking said port and starboard wheels, air flaps pivotally mounted in horizontal alignment transversely beneath the main wing structure for exerting a selective airbraking effort at one or the other or at both sides of the longitudinal centre simultaneously of said aircraft, and separate pedals operatively connected each with the air flap and brake of one side only of the aircraft.

JAMES D. M. GRAY.